Nov. 18, 1941.  H. J. MURPHY  2,263,543
HANDLE DEVICE
Filed Aug. 23, 1939

Inventor:
Howard J. Murphy.
By Walter S. Jones
Att'y.

Patented Nov. 18, 1941

2,263,543

UNITED STATES PATENT OFFICE 2,263,543

HANDLE DEVICE

Howard J. Murphy, Greenwood, Mass., assignor to United-Carr Fastener Corporation, Cambridge, Mass., a corporation of Massachusetts Application August 23, 1939, Serial No. 291,533

2 Claims. (Cl. 287—53)

My invention aims to provide improvements in a handle installation which includes a shaft, handle or knob and a fastening member for securing the handle or knob to the shaft.

In the drawing which illustrates a preferred embodiment of my invention:

Figure 1:
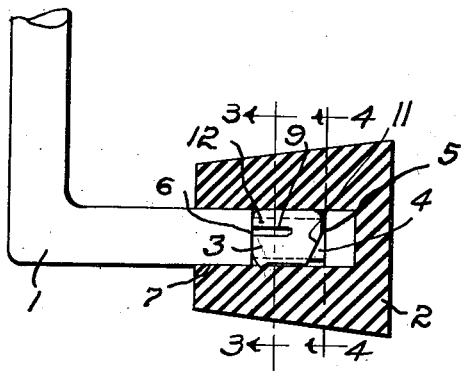
Fig. 1 is a sectional elevation of a preferred form of my invention showing the shaft and fastener in elevation and the knob or handle in section.
Figure 2:
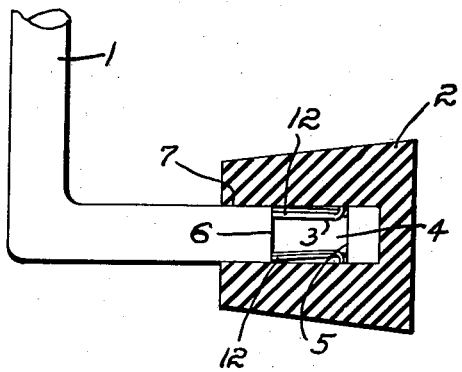
Fig. 2 is a view similar to Fig. 1 except that the fastener is shown as being turned 90°.

Referring now to the preferred form of my installation shown in the drawing, I have illustrated a shaft member 1 in the form of a crank which might be the crank for a window-lift in an automobile or the like, a handle member 2 and a sheet metal fastener member 3. The shaft 1 is provided with a reduced portion forming a neck 4 with shoulders 5 and 6 provided at the ends of the neck 4, as illustrated in Figs. 1 and 2. The handle 2 is provided with a bore 7 preferably not extending all the way through and adapted to receive the necked end of the shaft 1 as illustrated.

Figure 6:
Fig. 6 is an end view of the fastener member shown in Fig. 5.
Figure 7:
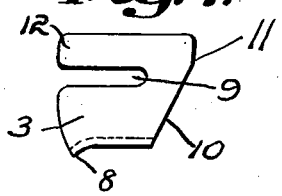
Fig. 7 is a side elevation of the fastener shown in Fig. 5.

The fastener member 3 is preferably formed from a single piece of sheet metal and is generally U-shaped in cross-section (Fig. 6), it being otherwise more or less tubular in form. This fastener is a relatively simple piece and quite easy to manufacture. It is provided adjacent to one end with an outwardly turned lip 8 forming an attaching portion (Fig. 1) and each of the U-shaped sides has a slit 9 extending inwardly from the same end of the fastener member as the lip 8 is located, as best shown in Fig. 7. The opposite end of the fastener is cut at a slight angle, as indicated by the numeral 10, to provide a sort of pivot or fulcrum point 11 the purposes of which will be more fully hereinafter described.

Figure 3:
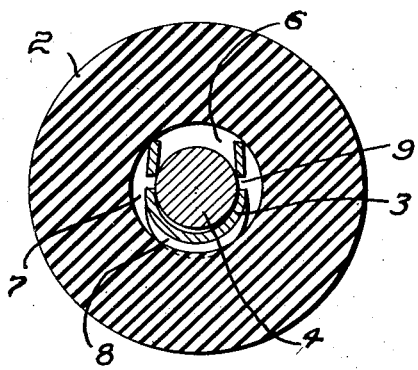
Fig. 3 is an enlarged section taken on the line 3—3 of Fig. 1.
Figure 4:
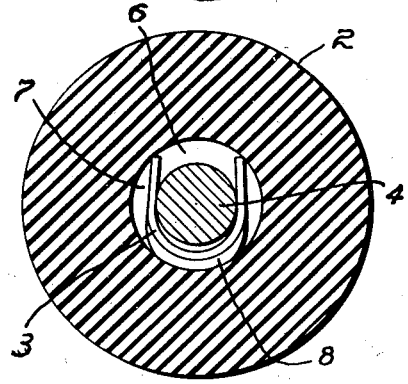
Fig. 4 is an enlarged section taken on the line 4—4 of Fig. 1.
Figure 5:
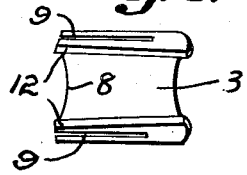
Fig. 5 is a top plan view of the fastener member per se.

To assemble the parts of the installation it is merely necessary to slide the fastener, open end of the U foremost, over the neck 4 in the shaft 1. In this manner the fastener is placed in the space between the two shoulders 5 and 6 and more or less around the neck 4 so that it may pass into the bore 7 in the handle 2 along with the shaft 1. It is preferably desirable to have the ends of the legs of the U-shaped construction closer together than the diameter of the neck so that the fastener will be snapped into place and will not fall off from the shaft during handling. It should be understood, however, that this last feature is not absolutely necessary to a complete operation of the fastener. As the end of the shaft 1 and the fastener 3 are forced into the bore 7 in the handle those portions 12 of the fastener between the slits 9 and the free edges of the U-shaped portion contract so that the lip or attaching portion 8 may pass into the bore 7. When the assembling of the parts is completed the attaching portion or lip 8 bites into the wall surrounding the bore 7 in the knob or handle 2 thus securing the parts in assembled relation. This biting action is effected by pressure exerted because of the tendency of the portions 12—12 to resume their normal positions and therefore a positive engagement is provided, as indicated in Fig. 1. This action is also clearly illustrated by an inspection of Fig. 3. Since the fastener part 3 preferably fits fairly closely between the shoulders 5 and 6 and outward movement of the shaft from the bore 7 is desired to be resisted, it is important that the bite between the fastener and the handle be maintained. To this end the pivot 11 comes into play because a tipping movement of the fastener about the projection 8 and also about the pivot 11 when brought into contact with the shoulder 5 causes the lip 8 to bite into the material of the handle to a greater extent as the tendency to pull the elements apart is increased.

My improved invention is a very simple one as will be observed by anyone skilled in the art, yet it is very practical and can be assembled in a very easy and quick manner. It is further useful inasmuch as it can be used with a crank handle installation if desired and the knob is free to rotate relative to the shaft to which it is attached.

While I have illustrated and described a preferred embodiment of my invention, I do not wish to be limited thereby because the scope is best defined by the following claims.

I claim:

1. In combination with a shaft and a handle having a bore for receiving an end of said shaft, of a fastener member for securing said handle to said shaft comprising a substantially U-shaped sheet metal plate having a curved bight and substantially straight sides of a length sufficient to extend beyond the periphery of the shaft, a handle biting lip turned outwardly from the bight portion on one end of said plate, said U-shaped plate being adapted to partially encircle and embrace said shaft with the free edge portions of the sides of the plate making line contacts with the bore in said handle in planes on opposite sides of said biting lip for forcing the lip into biting engagement with said handle as the handle is forced over the shaft and fastener member, the sides of said plate being slotted from the biting lip end to a point inwardly beyond the biting lip to provide increased resilience between the free edge portions and the biting lip.

2. A fastener member for securing a shaft to a handle having a bore receiving an end of said shaft, said fastener being substantially U-shaped in cross-section and otherwise being substantially tubular in shape, said fastener being adapted to partially encircle a reduced portion of said shaft between two oppositely facing shoulders provided by said shaft within said handle so as to be maintained against displacement endwise, and said fastener having a projecting portion cooperating with the free edges of the fastener to grip a wall surrounding the bore in said handle to hold the parts in assembly, said fastener having at least one slit permitting yielding of the fastener in a plane normal to the axis of the fastener, said projecting portion being located at one end of said fastener and the other end of said fastener being cut at an angle to provide a pivot point for the fastener against one of the shoulders on the shaft when removal stress is exerted on the fastener.

HOWARD J. MURPHY.